US012568288B2

(12) United States Patent
Materzyńska et al.

(10) Patent No.: US 12,568,288 B2
(45) Date of Patent: Mar. 3, 2026

(54) CUSTOMIZING MOTION AND APPEARANCE IN VIDEO GENERATION

(71) Applicant: ADOBE INC., San Jose, CA (US)

(72) Inventors: Joanna Irena Materzyńska, Cambridge, MA (US); Richard Zhang, Burlingame, CA (US); Elya Shechtman, Seattle, WA (US); Josef Sivic, Prague (CZ); Bryan Christopher Russell, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 56 days.

(21) Appl. No.: 18/584,210

(22) Filed: Feb. 22, 2024

(65) Prior Publication Data

US 2025/0142182 A1    May 1, 2025

Related U.S. Application Data

(60) Provisional application No. 63/594,328, filed on Oct. 30, 2023.

(51) Int. Cl.
*H04N 7/173* (2011.01)
*H04N 21/488* (2011.01)
*H04N 21/81* (2011.01)

(52) U.S. Cl.
CPC ....... *H04N 21/816* (2013.01); *H04N 21/4884* (2013.01)

(58) Field of Classification Search
CPC .......................... H04N 21/816; H04N 21/4884
USPC ........................................................ 725/116
See application file for complete search history.

(56) References Cited

U.S. PATENT DOCUMENTS

| | | | | |
|---|---|---|---|---|
| 10,810,493 B1 * | 10/2020 | Perozzi | .................... | G06N 7/01 |
| 11,769,531 B1 * | 9/2023 | Lucas | ................ | H04N 21/4667 |
| | | | | 386/282 |
| 11,908,180 B1 * | 2/2024 | Ho | ......................... | G06T 3/4053 |
| 12,106,318 B1 * | 10/2024 | Chiang | ................ | G06Q 30/016 |
| 12,167,169 B1 * | 12/2024 | Ganju | .................... | H04N 7/157 |
| 12,176,007 B1 * | 12/2024 | Rivers | .................... | G06F 21/10 |
| 2018/0288431 A1 * | 10/2018 | Liu | ......................... | G06N 3/047 |
| 2021/0182429 A1 * | 6/2021 | Chen | ....................... | H04L 51/10 |

(Continued)

FOREIGN PATENT DOCUMENTS

| | | |
|---|---|---|
| KR | 10-2117654 B1 | 6/2020 |
| WO | WO2020177214 A1 | 9/2020 |
| WO | WO2023124933 A1 | 7/2023 |

OTHER PUBLICATIONS

1Rombach, et al., "High-Resolution Image Synthesis with Latent Diffusion Models", arXiv preprint arXiv:2112.10752v2 [cs.CV] Apr. 13, 2022, pp. 1-45.
2Blattmann, et al., "Align your Latents: High-Resolution Video Synthesis with Latent Diffusion Models", arXiv preprint arXiv:2304. 08818v1 [cs.CV] Apr. 18, 2023, pp. 1-44.

(Continued)

*Primary Examiner* — Sahar Aqil Riaz
(74) *Attorney, Agent, or Firm* — F. CHAU & ASSOCIATES, LLC

(57) ABSTRACT

Systems and methods include generating synthetic videos based on a custom motion. A video generation system obtains a text prompt including an object and a custom motion token. The custom motion token represents a custom motion. The system encodes the text prompt to obtain a text embedding. Subsequently, a video generation model generates a synthetic video depicting the object performing the custom motion based on the text embedding using a video generation model.

20 Claims, 12 Drawing Sheets

(56) References Cited

U.S. PATENT DOCUMENTS

| | | | | |
|---|---|---|---|---|
| 2023/0051409 A1* | 2/2023 | Du | | H04N 7/157 |
| 2023/0260185 A1* | 8/2023 | Kim | | G06T 7/194 |
| 2023/0262293 A1 | 8/2023 | Barbieri et al. | | |
| 2023/0401824 A1* | 12/2023 | Khan | | G06V 10/7715 |
| 2024/0161761 A1* | 5/2024 | Islam | | H04N 19/20 |
| 2024/0221789 A1* | 7/2024 | Lucas | | H04N 21/854 |
| 2024/0265043 A1* | 8/2024 | Lytle | | G06F 40/42 |
| 2024/0304010 A1* | 9/2024 | Gothe | | G06T 7/20 |
| 2024/0305744 A1* | 9/2024 | Mishra | | G06V 20/46 |
| 2024/0394511 A1* | 11/2024 | Thevenin | | G06N 3/088 |
| 2024/0395061 A1* | 11/2024 | Jin | | G06V 10/82 |
| 2025/0005918 A1* | 1/2025 | Willmott | | G06V 10/86 |
| 2025/0095508 A1* | 3/2025 | Jacobs, II | | G06T 19/006 |
| 2025/0111655 A1* | 4/2025 | Povalyaev | | G06T 11/00 |
| 2025/0119624 A1* | 4/2025 | Oh | | H04N 21/816 |
| 2025/0175679 A1* | 5/2025 | Zhang | | H04N 21/816 |
| 2025/0245866 A1* | 7/2025 | Huang | | G06T 11/00 |
| 2025/0292443 A1* | 9/2025 | Zhang | | G06T 11/00 |

OTHER PUBLICATIONS

3Chen, et al., "DisenBooth: Identity-Preserving Disentangled Tuning for Subject-Driven Text-to-Image Generation", arXiv preprint arXiv:2305.03374v2 [cs.CV] May 18, 2023, pp. 1-13.

4Chen, et al., "Subject-driven Text-to-Image Generation via Apprenticeship Learning", arXiv preprint arXiv:2304.00186v5 [cs.CV] Oct. 2, 2023, 19 pages.

5Gal, et al., "An Image is Worth One Word: Personalizing Text-to-Image Generation using Textual Inversion", arXiv preprint arXiv:2208.01618v1 [cs.CV] Aug. 2, 2022, 26 pages.

6Guo, et al., "AnimateDiff: Animate Your Personalized Text-to-Image Diffusion Models without Specific Tuning", arXiv preprint arXiv:2307.04725v1 [cs.CV] Jul. 10, 2023, pp. 1-13.

7Molad, et al., "Dreamix: Video Diffusion Models are General Video Editors", arXiv preprint arXiv:2302.01329v1 [cs.CV] Feb. 2, 2023, pp. 1-18.

8Xiao, et al., "FastComposer: Tuning-Free Multi-Subject Image Generation with Localized Attention", arXiv preprint arXiv:2305.10431v2 [cs.CV] May 21, 2023, 12 pages.

* cited by examiner

Figure 7:
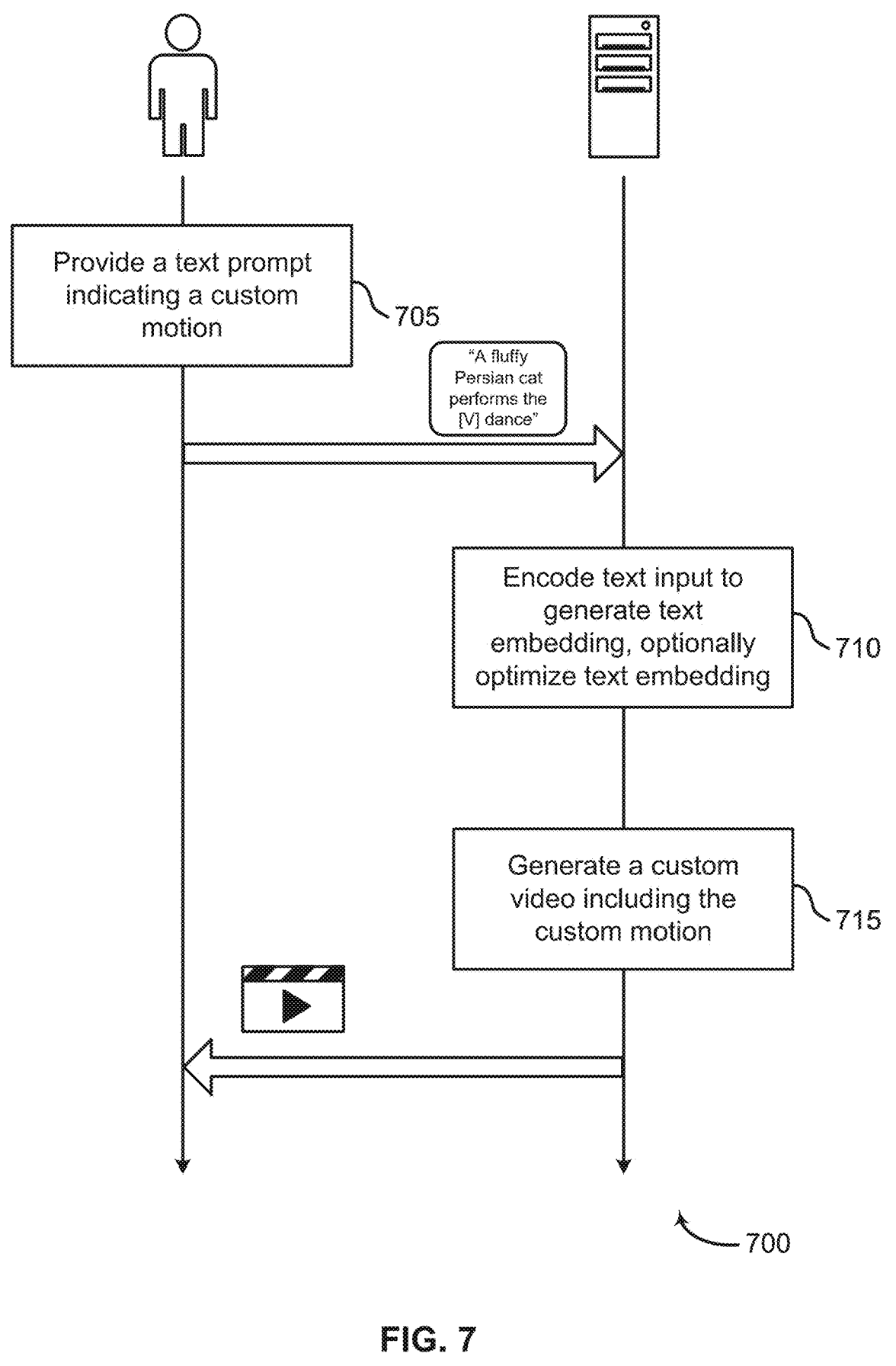

Provide a text prompt indicating a custom motion — 705

"A fluffy Persian cat performs the [V] dance"

Encode text input to generate text embedding, optionally optimize text embedding — 710

Generate a custom video including the custom motion — 715

Obtain a text prompt indicating a custom motion ⟍ 805

Encode the text prompt to obtain a text embedding ⟍ 810

Generate a synthetic video depicting the custom motion based on the text embedding ⟍ 815

⟍ 800

Create a training set including video clips depicting a plurality of different entities performing a custom motion —1005

Train, using the training set, a video generation model to generate synthetic videos depicting an arbitrary entity performing the custom motion based on a custom motion token in a text prompt —1010

—1000

Figure 12:
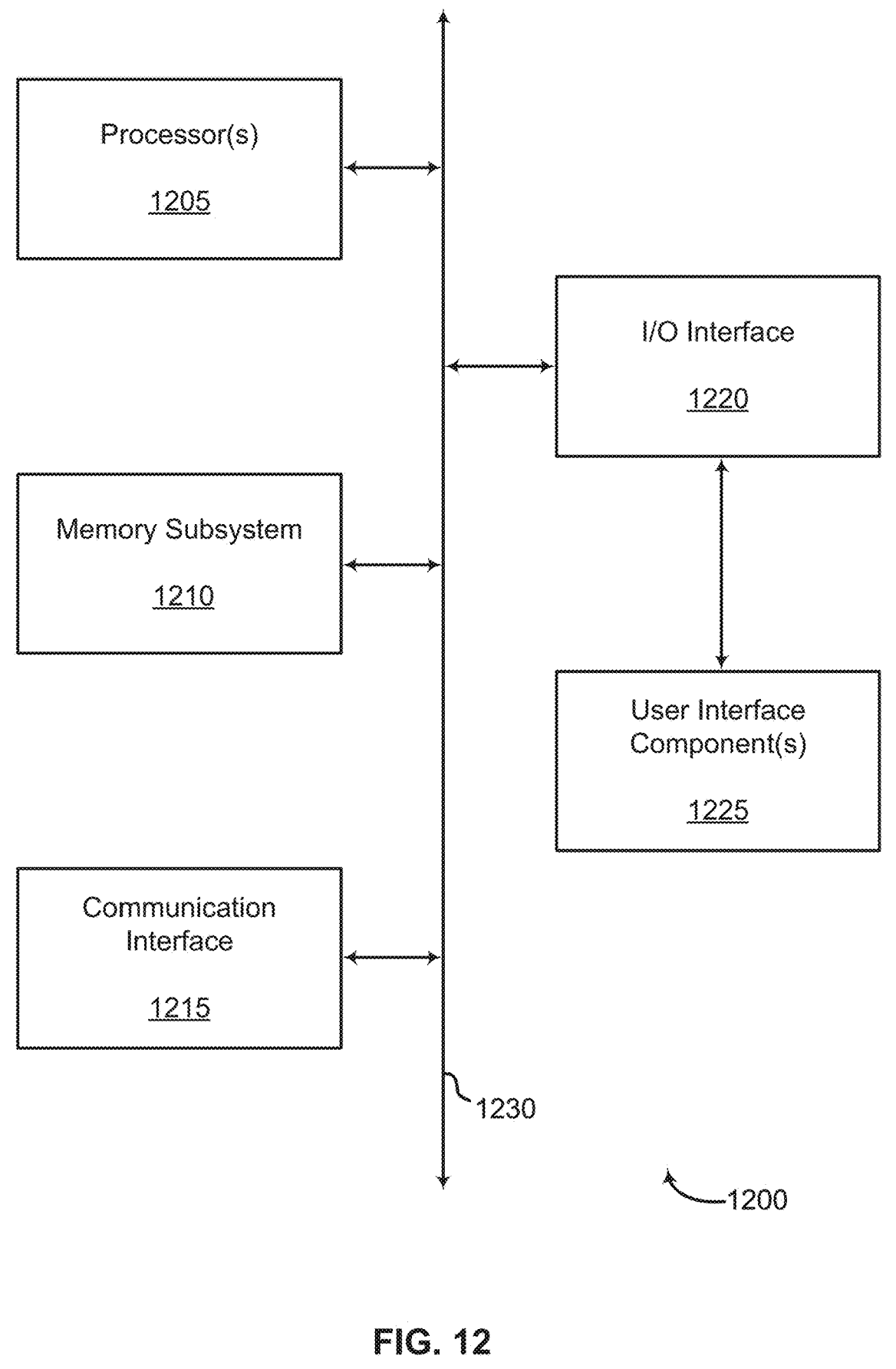

Processor(s)

1205

I/O Interface

1220

Memory Subsystem

1210

User Interface
Component(s)

1225

Communication
Interface

CUSTOMIZING MOTION AND APPEARANCE IN VIDEO GENERATION

CROSS-REFERENCE TO RELATED APPLICATION

This U.S. non-provisional application claims priority under 35 U.S.C. § 119 to U.S. Provisional Patent Application No. 63/594,328, filed on Oct. 30, 2023, in the United States Patent and Trademark Office, the disclosure of which is incorporated by reference herein in its entirety.

BACKGROUND

The relates generally to image processing, and more specifically to video generation. Image processing is a type of data processing that involves the manipulation of an image to get the desired output, typically utilizing specialized algorithms and techniques. Image processing is used to perform operations on an image to enhance its quality or to extract useful information from it. This process usually comprises a series of steps that includes the importation of the image, its analysis, manipulation to enhance features or remove noise, and the eventual output of the enhanced image or salient information it contains.

Image processing techniques are also used for image generation. For example, machine learning (ML) techniques have been applied to create generative models that can produce new image content. One use for generative AI is to create images based on an input prompt. This task is often referred to as a "text to image" task or simply "text2img", though image, video, and other types of prompts can be used. ML models including Generative Adversarial Networks (GANs) and Variational Autoencoders (VAEs) have been adapted to generate pixel data to create novel images. Newer approaches such as denoising diffusion probabilistic models (DDPMs) iteratively refine generated images in based on a guidance, such as a text prompt. Recently, image generation models have been adapted for use in video generation, by using the models to generate frames of videos.

SUMMARY

Systems and methods for generating videos with a custom motion are described herein. Embodiments include a video generation apparatus that is configured to identify a custom motion from a text prompt, and then to generate a video including that custom motion. In some cases, the custom motion is identified by a nonce character in the text prompt, such as '[V]'. A text encoder processes the text prompt to produce a text embedding which includes a custom motion token. The custom motion token is a vector representation of the concept of the custom motion learned by a video generation model. This token is decoded by the video generation model during a generative process to produce the video. In some embodiments, the video generation model includes a diffusion model architecture. Some embodiments are further configured to generate videos including a custom appearance using similar methods.

A method, apparatus, non-transitory computer readable medium, and system for video generation are described. One or more aspects of the method, apparatus, non-transitory computer readable medium, and system include obtaining a text prompt including an object and a custom motion token, wherein the custom motion token represents a custom motion; encoding the text prompt to obtain a text embedding; and generating, using a video generation model, a synthetic video depicting the object performing the custom motion based on the text embedding.

A method, apparatus, non-transitory computer readable medium, and system for video generation are described. One or more aspects of the method, apparatus, non-transitory computer readable medium, and system include obtaining a training set including a plurality of video clips depicting a plurality of different entities performing a custom motion, respectively; and training, using the training set, a video generation model to generate synthetic videos depicting an arbitrary entity performing the custom motion based on a custom motion token in a text prompt. In some cases, obtaining a training set can include obtaining creating a custom training set or using a preexisting set of training data for training the machine learning model.

An apparatus, system, and method for video generation are described. One or more aspects of the apparatus, system, and method include at least one processor; at least one memory storing instructions executable by the at least one processor; and a video generation model comprising parameters stored in the at least one memory and trained to generate a synthetic video depicting an arbitrary entity performing a custom motion, where the custom motion is identified by a custom motion token within a text prompt.

BRIEF DESCRIPTION OF THE DRAWINGS

FIG. 7 shows an example of a method for providing a custom video to a user according to aspects of the present disclosure.

FIG. 12 shows an example of a computing device according to aspects of the present disclosure.

DETAILED DESCRIPTION

Figure 1:
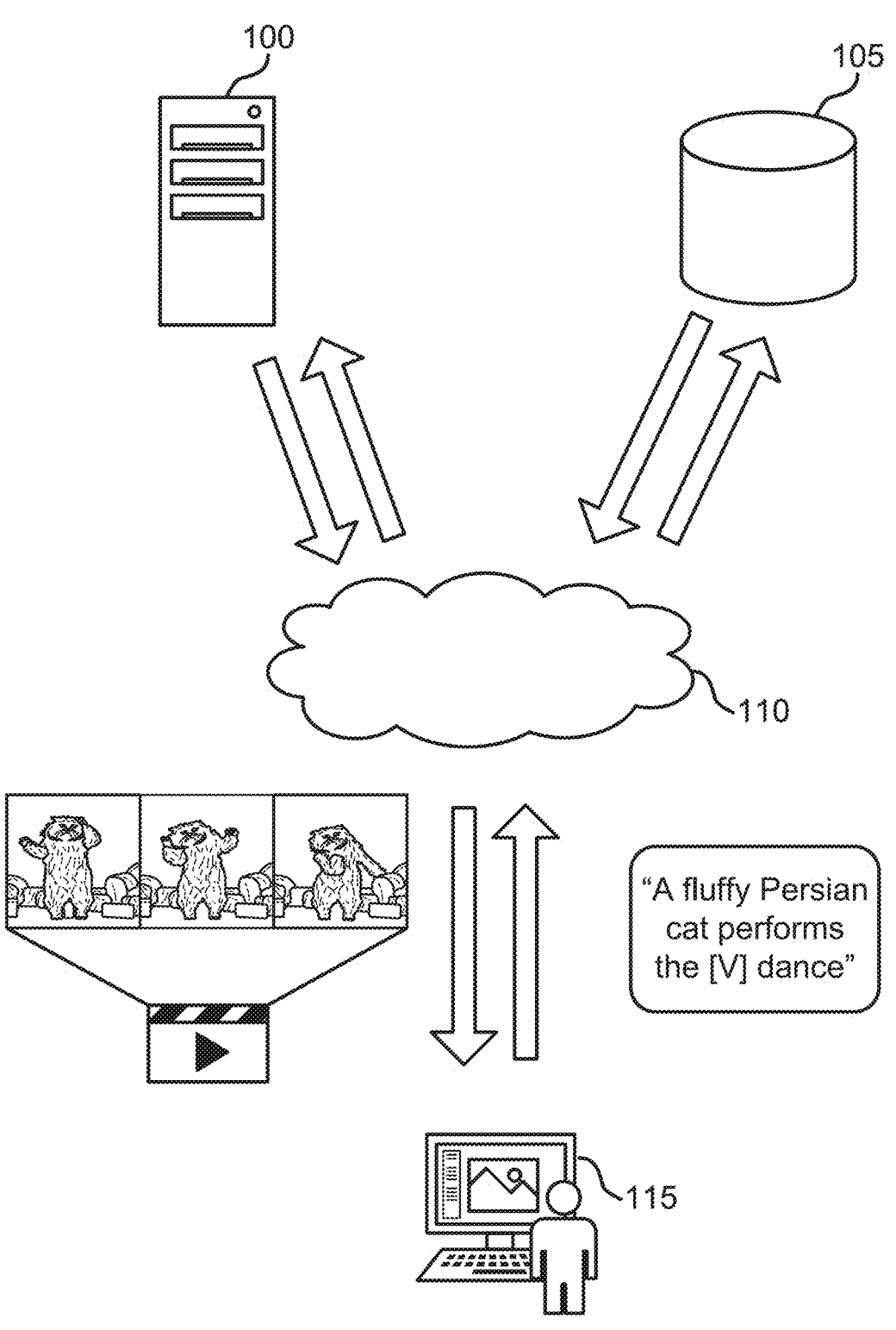
FIG. 1 shows an example of video generation system according to aspects of the present disclosure.

Image processing is a fundamental aspect of computer vision, focusing on the manipulation, analysis, and interpretation of visual data. With the development of advanced algorithms and computational techniques, image processing has expanded to include image generation. Generative models, in particular, have enabled the synthesis of realistic images based on varied inputs.

Building on the foundation of image generation, the principles have been extended to video generation. In this context, adaptations such as temporal encoding have been introduced to maintain coherence and continuity across sequential frames. While generative models have proven effective for image synthesis, the generation of consistent and realistic video sequences presents additional challenges due to the added dimension of time. Furthermore, creators have struggled to generate specific concepts such as specific identities of actors or objects, or particular motions, in synthesized videos.

There are some conventional systems and approaches for synthesizing particular concepts in generated concepts. There are text-to-image customization methods, which focus on transferring appearances to generated images. However, these systems are primarily designed for images and, as a result, do not cater to video generation where motion and temporal consistency are essential. Some controllable video generation systems have been tuned to learn specific human dances and transfer them to various actors, however, they cannot learn generalized motion concepts, and as such the learned motions can't reproduced by characters or objects that aren't human. Other methods include inverting an existing video frame-by-frame using a pre-trained text to image model, and then using the inverted noise maps and text guidance to synthesize a video. However, this is restricted to editing an existing video, and does not allow the creation of new videos.

Some approaches learn a separate motion model to generate motion priors, which involves a separate model and parameters, imparting considerable computational overhead. Further, the motion concepts learned by the motion models are relatively simple, and generally can only be transferred to another single subject. Lastly, some text-to-video models have been developed to add new subjects to a base generative model. While they demonstrate capabilities in learning appearances, these systems do not efficiently learn or transfer motion concepts, limiting their application in dynamic video generation scenarios.

Embodiments of the present disclosure improve on video generation systems by enabling the generation of synthetic videos with a custom motion concept that can be applied to any actor or object. Conventional video generation models do not transfer custom motions to new objects, so to perform this task using conventional tools would involve costly and time-consuming frame-by-frame editing, such as roto-scoping or otherwise using an existing basis video. By contrast, embodiments of the present disclosure generate videos with custom motions transferred to new objects quickly and efficiently.

Embodiments of the disclosure include a video generation model that is tuned to learn both custom motion concepts and custom appearance concepts, without using separate adapter models or layers. The learned concepts are not spatially restricted. For example, a dance can be learned during training, and the generated video can include multiple actors performing the same dance in different areas. The motion concepts are further not restricted to motions performed by actors: in another example, a camera movement that follows a subject in a particular way can be learned and reproduced.

A video generation system is described with reference to FIGS. 1-6. Methods for generating videos with a custom motion are described with reference to FIGS. 7-8. Methods for training a machine learning model including a video generation model are described with reference to FIGS. 9-11. A computing device configured to implement a video generation apparatus is described with reference to FIG. 12.

Video Generation System

An apparatus for video generation is described. One or more aspects of the apparatus include at least one processor; at least one memory storing instructions executable by the at least one processor; and a video generation model comprising parameters stored in the at least one memory and trained to generate a synthetic video based on a text prompt and a custom motion token representing a custom motion, wherein the synthetic video depicts the custom motion.

Some examples of the apparatus, system, and method further include a user interface configured to obtain the text prompt. Some examples further include a text encoder configured to encode the text prompt to obtain a text embedding. In some embodiments, the video generation model comprises a diffusion model. In some embodiments, the video generation model comprises a transformer model.

Some examples of the apparatus, system, and method further include an embedding optimizer configured to contextualize the custom motion token. Some examples of the apparatus, system, and method further include a training component configured to train the video generation model based on training data.

FIG. 1 shows an example of video generation system according to aspects of the present disclosure. The example shown includes video generation apparatus 100, database 105, network 110, and user interface 115.

In an example process, a user provides a text input that identifies a custom motion. The custom motion may be identified using a nonce character, such as the "[V]" as shown. Then, video generation apparatus 100 processes the text input to generate a synthetic video based on the text input. The synthetic video includes the custom motion. The synthetic video may also include other details from the prompt. Accordingly, the system enables a user to generate videos that depict a custom motion performed by a variety of actors, including humans, animals, characters, and the like.

Embodiments of the video generation apparatus 100 include components that are implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

The video generation apparatus 100 may also have one or more components implemented in a user device. In other words, the video generation apparatus 100 may include modules including instructions that are stored and/or executed on a user device, and other modules including instructions that are stored and/or executed on a server. In some cases, the modules are split into yet another server, such a server that is dedicated to the training of the models included in video generation apparatus 100, or a server dedicated to adjusting text embeddings. Video generation apparatus 100 is an example of, or includes aspects of, the corresponding element described with reference to FIG. 2.

Database 105 stores information used by the video generation system. For example, the database may store previous prompts, previously generated videos, video generation model parameters, training data, user configuration settings, and the like. A database 105 is an organized collection of data. For example, a database 105 stores data in a specified format known as a schema. A database may be structured as a single database, a distributed database, multiple distributed databases, or an emergency backup database. In some cases, a database controller may manage data storage and processing in a database. In some cases, a user interacts with a database controller. In other cases, a database controller may operate automatically without user interaction.

Network 110 facilitates the transfer of information between video generation apparatus 100, database 105, and a user, e.g., via user interface 115. In some cases, a network is referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

User interface 115 enables a user to interact with a device. In some embodiments, the user interface 115 may include an audio device, such as an external speaker system, an external display device such as a display screen, or an input device (e.g., a remote-control device interfaced with the user interface directly or through an IO controller module). In some cases, a user interface 115 may be a graphical user interface (GUI). For example, the GUI may be a part of a web application, or a part of a program such as a design document editing software.

According to some aspects, user interface 115 obtains a text prompt indicating a custom motion. For example, a user may enter the text prompt in a text field of the user interface. In some aspects, the text prompt includes a nonce character representing the custom motion. User interface 115 is an example of, or includes aspects of, the corresponding element described with reference to FIG. 2.

Figure 2:
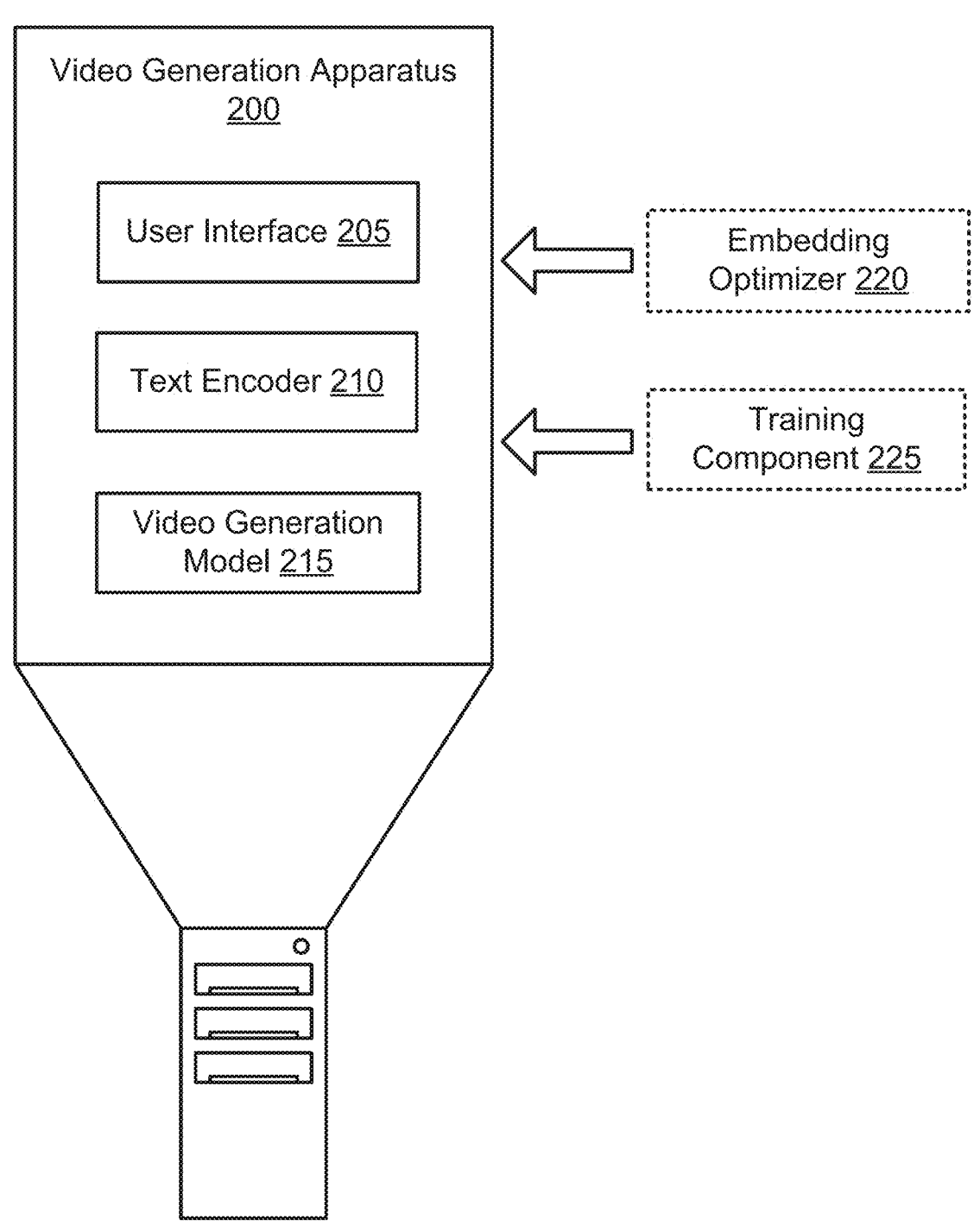
FIG. 2 shows an example of video generation apparatus according to aspects of the present disclosure.

FIG. 2 shows an example of video generation apparatus 200 according to aspects of the present disclosure. The example shown includes video generation apparatus 200, user interface 205, text encoder 210, video generation model 215, embedding optimizer 220, and training component 225.

Video generation apparatus 200 is an example of, or includes aspects of, the corresponding element described with reference to FIG. 1. User interface 205 is an example of, or includes aspects of, the corresponding element described with reference to FIG. 1. A user interface 205 may be implemented as a part of video generation apparatus 200, or may be implemented on another device, such as a user device as shown in FIG. 1. Text encoder 210 is an example of, or includes aspects of, the corresponding element described with reference to FIGS. 3 and 6. Video generation model 215 is an example of, or includes aspects of, the corresponding element described with reference to FIGS. 3, 4, and 11. Training component 225 is an example of, or includes aspects of, the corresponding element described with reference to FIG. 11.

Embodiments of video generation apparatus 200 include component parts which may further be divided into subcomponents. These components are variously named and are described so as to partition the functionality enabled by the processor(s) and the executable instructions included in the computing device used in video generation apparatus 200 (such as the computing device described with reference to FIG. 12). In some examples, the partitions are implemented physically, such as through the use of separate circuits or processors for each component. In some examples, the partitions are implemented logically via the architecture of the code executable by the processors.

Video generation apparatus 200 includes components which include one or more artificial neural network (ANN) subcomponents. For example, text encoder 210, video generation model 215, and embedding optimizer 220 include ANN subcomponents. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

User interface 205 enables a user to interact with video generation apparatus 200, and may include a display, input/output devices such as a mouse and a keyboard, and one or more graphical user interface (GUI) elements displayed on the display. In some cases, user interface 205 is implemented as a part of a separate device, e.g., an edge device or a user device.

Text encoder 210 is configured to generate a text embedding from a text prompt. A text embedding is a vector representation of text captures meaning from the input text. Embodiments of text encoder 210 include a transformer-based encoder such as Flan-T5 or the CLIP text encoder. A transformer or transformer network is a type of neural network model used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes an attention mechanism, where the attention looks at an input sequence and decides at each step which other parts of the sequence are important.

The attention mechanism involves query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence as Q. However, for the attention module that is considering the encoder and the decoder sequences, V is different from the sequence represented by Q. In some cases, values in V are multiplied and summed with some attention-weights a.

Embodiments of text encoder 210 are not limited to the Flan-T5 encoder or the CLIP text encoder, and may include any encoder configured to generate a vector representation of text. Text encoder 210 identifies a custom motion token corresponding to a custom motion. The custom motion token may be or may be a part of the text embedding described above.

Video generation model 215 is configured to generate synthetic videos. Embodiments of video generation model 215 include an image generation model such as a diffusion model that has been adapted to generate temporally coherent frames in a sequence. For example, the video generation model 215 may include a diffusion model with additional temporal layers. According to some aspects, video generation model 215 generates, using a video generation model 215, a synthetic video based on the text prompt and the custom motion token, where the synthetic video depicts the custom motion. In some embodiments, the video generation model 220 includes a generative transformer model.

In some aspects, the video generation model 215 is tuned to depict a custom motion based on a custom motion token. For example, embodiments video generation model 215 may include a pre-trained video generation model that is trained on a large dataset, and which is tuned using training data depicting the custom motion to learn the custom motion as a new concept. According to some aspects, a "custom motion token" corresponds to a part of the text embedding produced by text encoder 210, though embodiments are not limited thereto. In at least one embodiment, the custom motion token corresponds to one or more words in the input text prompt, which is extracted as a custom token by a tokenizer.

Some embodiments of the video generation apparatus 200 adjust the text embedding from text encoder 210 so that the generated synthetic video is of higher quality. For example, an embedding optimizer 220 may be trained to adjust the text embedding at inference by altering the values within the text embedding. As used herein, training may be synonymous with "finetuning" or "tuning." During this training, embedding optimizer 220 may learn a general transformation that is applied to any and all text embeddings. In some cases, each embedding has a custom transformation applied to it at inference based on the particular text embedding. In some cases, a general transformation is applied to all text embeddings, while a finetuning transformation is further selectively applied that is unique to each text embedding. According to some aspects, embedding optimizer 220 adjusts the text embedding while parameters of video generation model 215 are fixed.

According to some aspects, embedding optimizer 220 optimizes the custom motion token. In some examples, embedding optimizer 220 contextualizes the custom motion token based on the text prompt, where the synthetic video is based on the contextualized custom motion token. For example, the contextualization may include adjusting embeddings of each word in a text prompt based on the other embeddings of the remaining words, so as to increase semantic alignment. These adjustments may be performed by a trained model in embedding optimizer 220, such as a transformer-based model.

According to some aspects, embedding optimizer 220 optimizes the custom motion token using the video generation model 215. For example, embedding optimizer 220 may evaluate an output from video generation model 215, and then optimize the custom motion token based on discrepancies from an expected output. In some examples, embedding optimizer 220 contextualizes the custom motion token based on the text prompt, where the synthetic video is based on the contextualized custom motion token. In at least one embodiment, embedding optimizer 220 is implemented on an apparatus different from video generation apparatus 200.

In some examples, training component 225 augments the training data by generating one or more additional video clips based on the set of video clips. In some examples, training component 225 augments the training data by generating a set of captions for each of the set of video clips, respectively. In some aspects, training component 225 tunes the video generation model 220 using a reconstruction loss and a regularization loss, where the regularization loss reduces the association between the custom motion and one or more objects performing the custom motion the set of video clips. In some aspects, training component 225 tunes the video generation model 220 by fixing one or more appearance layers and updating one or more temporal layers. In some cases, the appearance layers generate latent embeddings that are more influential on the spatial and structural features of the generated video, whereas the temporal layers generate latent embeddings that are more influential on the motion features of the generated video. In at least one embodiment, training component 225 is implemented on an apparatus different from video generation apparatus 200.

Figure 3:
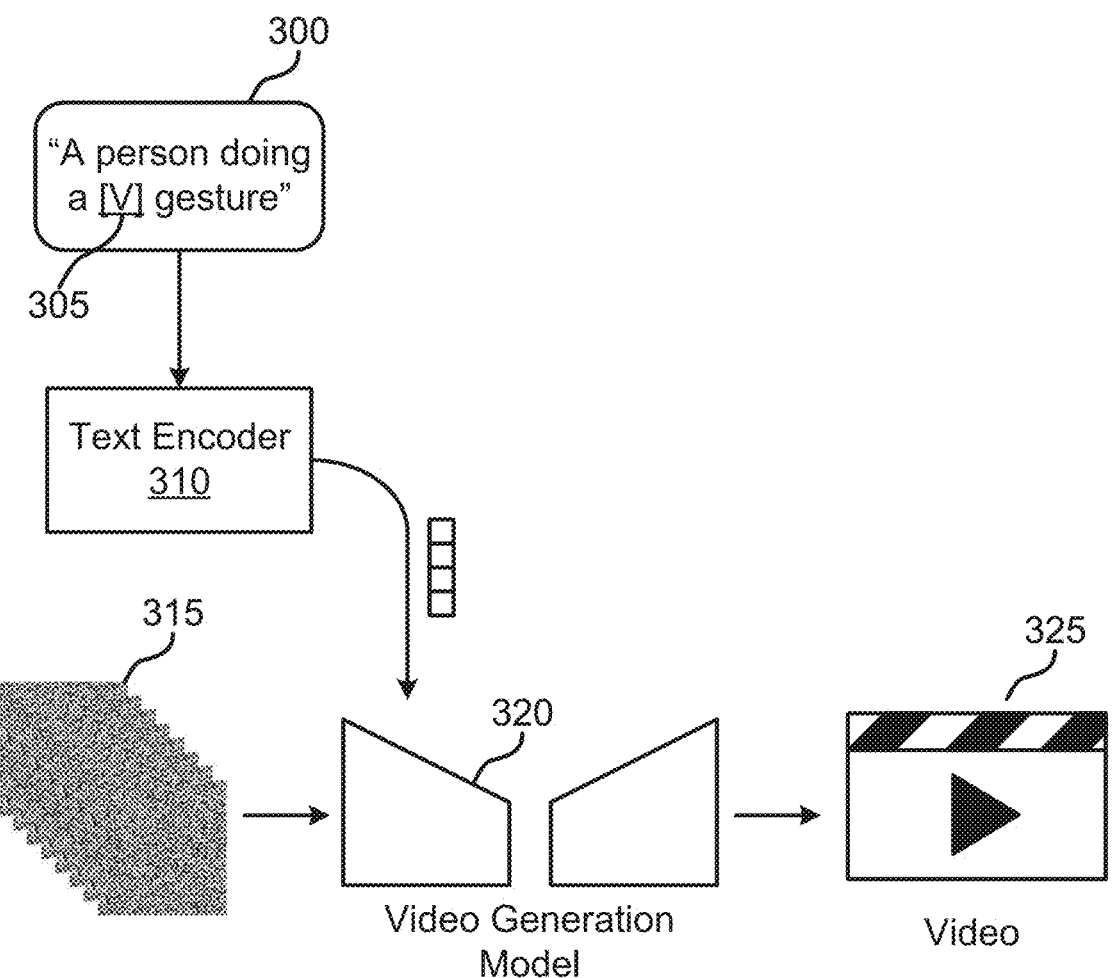
FIG. 3 shows an example of a video generation pipeline according to aspects of the present disclosure.

FIG. 3 shows an example of a video generation pipeline according to aspects of the present disclosure. The example shown includes text prompt 300, text encoder 310, noise samples 315, video generation model 320, and output video 325.

Text prompt 300 is an example of, or includes aspects of, the corresponding element described with reference to FIG. 6. Text encoder 310 is an example of, or includes aspects of, the corresponding element described with reference to FIGS. 2 and 6. Video generation model 320 is an example of, or includes aspects of, the corresponding element described with reference to FIGS. 2, 4, and 11.

In this example, the system receives text prompt 300 indicating a custom motion. A user may provide the text prompt 300 e.g., via user interface, or the text prompt 300 may be obtained in another way, such as from another automated system. In this example, text prompt 300 indicates a custom motion, the "[V] gesture", using the nonce character 305 "[V]". Then, text encoder 305 processes text prompt 300 to generate a text embedding. The text embedding may include a custom token corresponding to the custom motion. For example, the text embedding may include a vector in an embedding space corresponding to the "[V]" in the text, where the vector is the custom token.

A noise component or noise sampler may produce noise samples 315, which are a series of pure noise images. The sampler may initially sample from, e.g., a pure Gaussian noise distribution. Then, video generation model 320 generates output video 325 based on noise samples 315 and the text embedding, the text embedding including the custom motion token. According to some aspects, the prior training of video generation model 320 enables the video generation model 320 to produce the custom motion in output video 325 when conditioned by the custom motion token in the text embedding space.

In some cases, at inference, the video generation model samples noise in a particular way. For example, The denoising process of diffusion is defined over $t \in \{0, 1, 2, \ldots, T\}$ diffusion timesteps, where $x_T$ is pure Gaussian noise and $x_0$ an image. When applying Eq. (2), instead of uniformly sampling the timestep, some embodiments sample the timestep according to a skewed distribution $$f_a(t) = \frac{1}{T}\left(1 - \alpha \cos\left(\frac{\pi t}{T}\right)\right).$$

In some cases, the earlier stages of the diffusion process have more influence over the structure of the video, whereas the later ones mostly contribute to the fine-grained details since the image is mostly formed. In some cases, the a parameter increases the skewness of the function and is set to $\alpha=0.5$. Additional detail regarding a reverse diffusion process (e.g., denoising) is provided with reference to FIG. 6.

Figure 4:
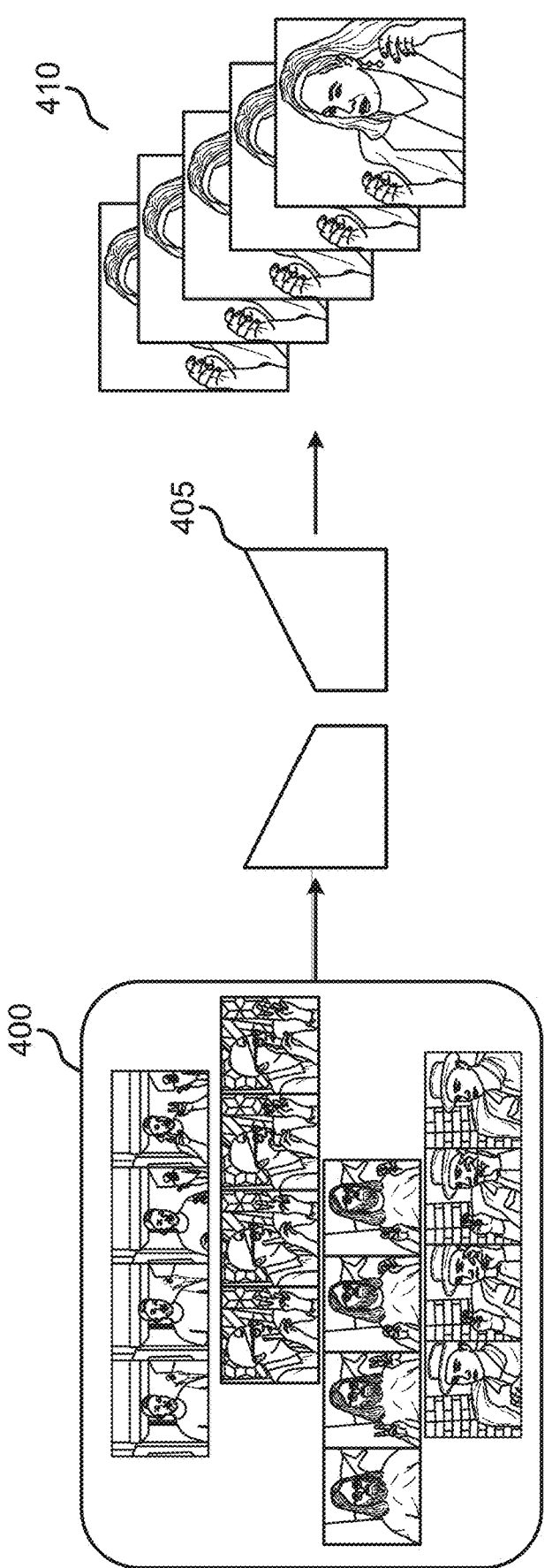
FIG. 4 shows an example of an output video depicting a custom motion according to aspects of the present disclosure.

FIG. 4 shows an example of an output video 410 depicting a custom motion according to aspects of the present disclosure. The example shown includes training clips 400, video generation model 405, and output video 410. Training clips 400 is an example of, or includes aspects of, the corresponding element described with reference to FIG. 11. Video generation model 405 is an example of, or includes aspects of, the corresponding element described with reference to FIGS. 2, 3, and 11.

In this example, the training data includes real (i.e., not synthetic or generated) clips training clips 400 which include actors performing an [X] motion, e.g. an "air quotes" motion. A user may provide a text prompt that indicates a custom motion. The text prompt used in this example may be "a person performing [X] motion". The video generation model 405 then generates output video 410 depicting a person who was not in the training data, thus generalizing the motion to a new actor.

Figure 5:
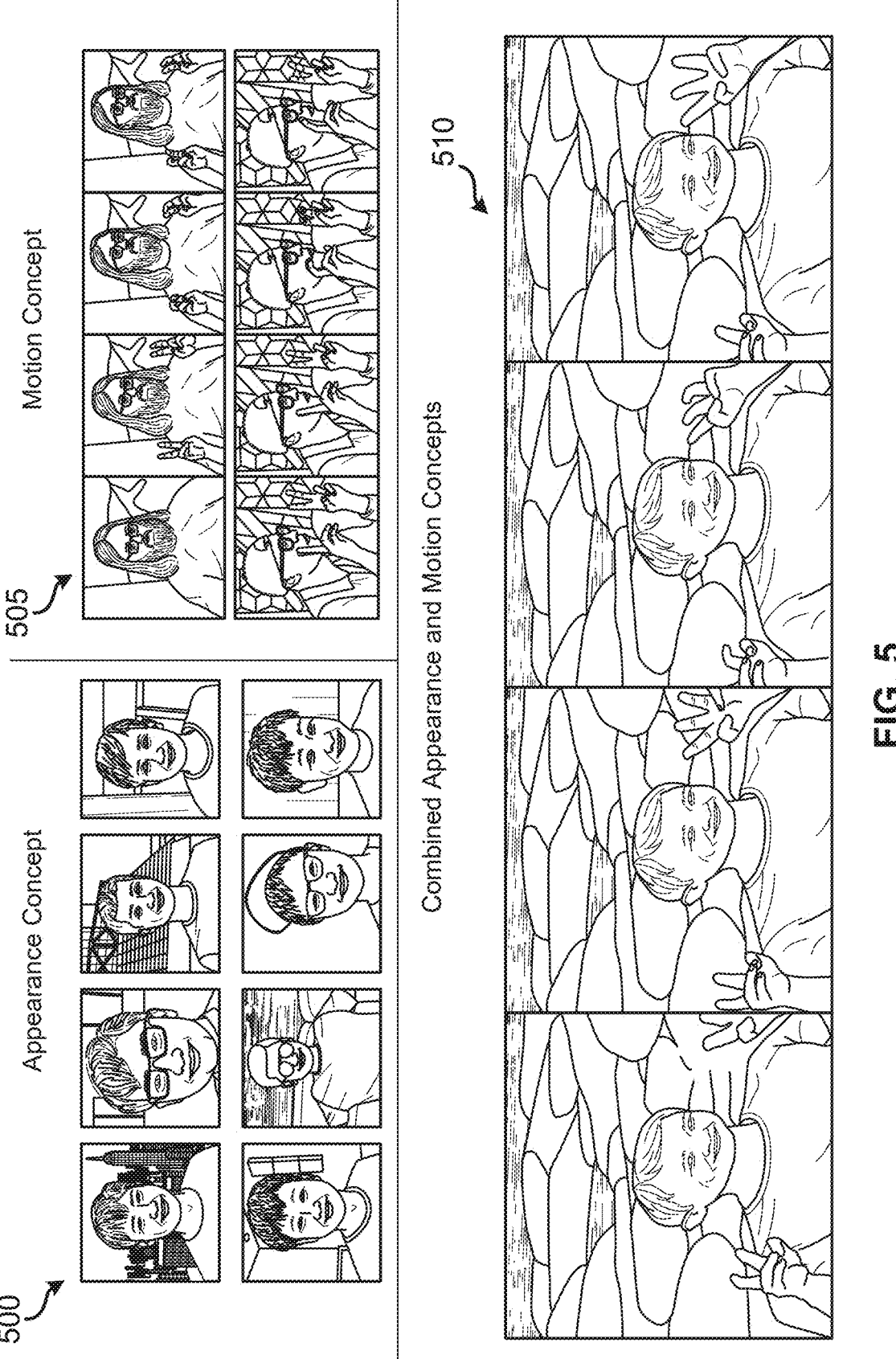
FIG. 5 shows an example of an output video with custom motion and custom appearance according to aspects of the present disclosure.

FIG. 5 shows an example of an output video with custom motion and custom appearance according to aspects of the present disclosure. The example shown includes training clips with custom appearance 500, training clips with custom motion 505, and output with custom motion and custom appearance 510.

In some cases, the video generation system can learn a custom appearance concept and a custom motion concept. The video generation system may be trained based on one or more loss functions using training clips with custom appearance 500 and training clips with custom motion 505. Additional detail regarding training including the loss functions is described with reference to FIG. 11. In this example, the custom appearance is linked to the nonce character "[V]", and the custom motion is linked to the nonce character "[X]". Then, a user can invoke both the custom appearance concept and the custom motion concept by inserting both nonce characters into a text prompt, e.g., "A [V] man doing the [X] on a beach." Then, the video generation system will generate output with custom motion and custom appearance 510 that includes both the appearance concept and the motion concept.

Figure 6:
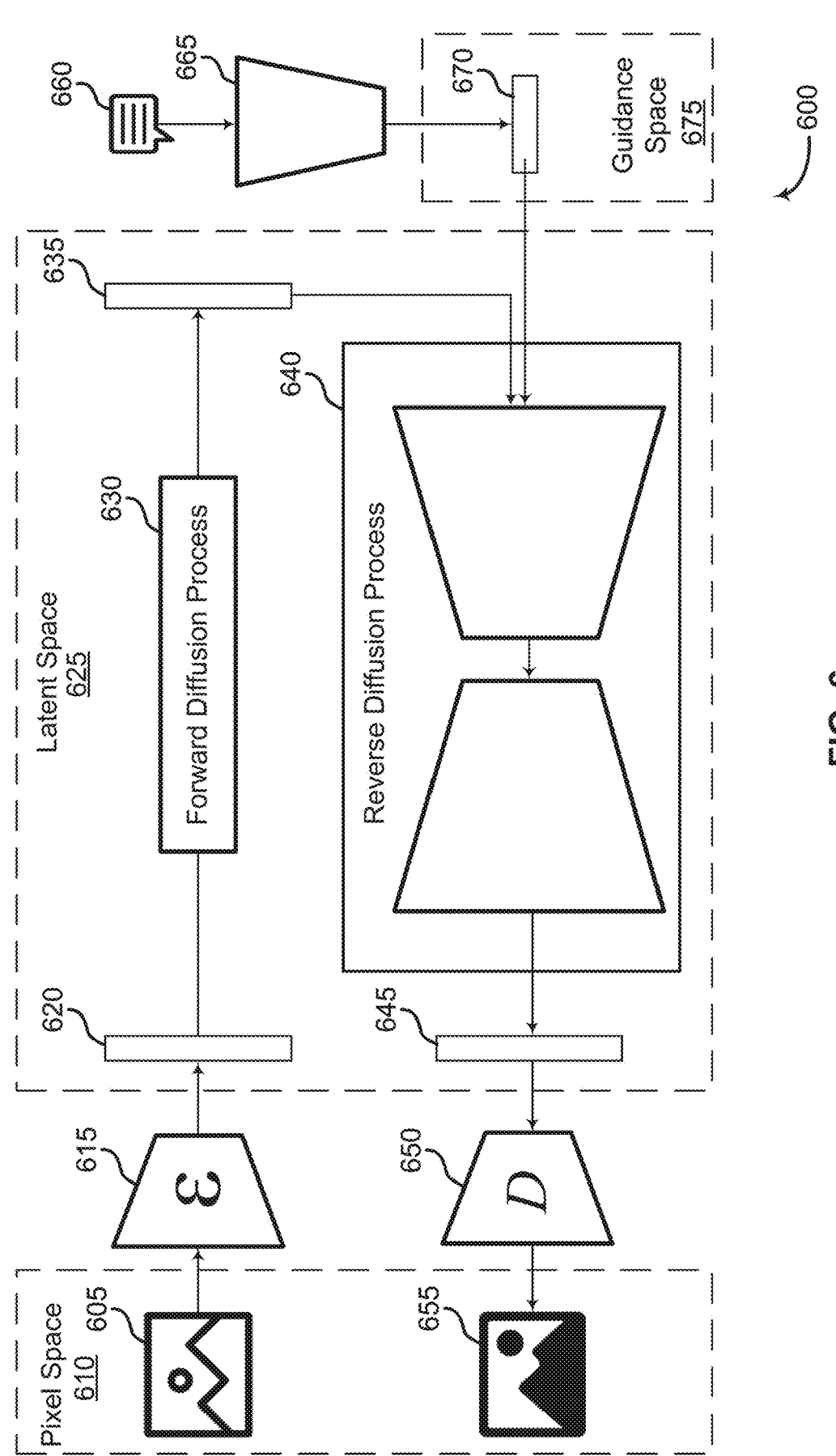
FIG. 6 shows an example of a video generation model according to aspects of the present disclosure.

FIG. 6 shows an example of a video generation model according to aspects of the present disclosure. The example shown includes guided latent diffusion model 600, original image 605, pixel space 610, image encoder 615, original image features 620, latent space 625, forward diffusion process 630, noisy features 635, reverse diffusion process 640, denoised image features 645, image decoder 650, output image 655, text prompt 660, text encoder 665, guidance features 670, and guidance space 675. Text prompt 660 is an example of, or includes aspects of, the corresponding element described with reference to FIG. 3. Text encoder 665 is an example of, or includes aspects of, the corresponding element described with reference to FIGS. 2 and 3.

In an example process, guided latent diffusion model 600 processes original image 605 in pixel space 610 using an image encoder 615 to generate original image features 620 in a latent space 625. The pixel space includes height, width, and color channel dimensions, whereas the latent space can include a different or higher dimensionality than the pixel space. Embeddings within the latent space capture additional relationships, such as semantic information, structural features, and local and global influences. A forward diffusion process 630 iteratively adds noise to original image features 620 to produce noisy features 635. A reverse diffusion process 640 iteratively removes noise to produce denoised image features 645. The denoised image features 645 are decoded using image decoder 650 to produce output image 655 in pixel space 610. In some cases, the reverse diffusion process 640 is guided using guidance features 670 in a guidance space 675, which may be the same or different from latent space 625. For example, a text encoder 665 may encode a text prompt 660 to produce guidance features 670. Guidance features 670 are also vector representations that can be combined with or referenced by embeddings at various stages of the reverse diffusion process 640 to condition the generation of images and videos.

The example shown is a latent diffusion-based video generation model. The following will describe a general guided latent diffusion model. Such models are typically used for image generation, but can also intuitively be used for video generation, as videos include a sequence of images. In some examples, diffusion models are based on a neural network architecture known as a U-Net. The U-Net takes input features having an initial resolution and an initial number of channels, and processes the input features using an initial neural network layer (e.g., a convolutional network layer) to produce intermediate features. The intermediate features are then down-sampled using a down-sampling layer such that down-sampled features have a resolution less than the initial resolution and a number of channels greater than the initial number of channels.

This process is repeated multiple times, and then the process is reversed. That is, the down-sampled features are up-sampled using up-sampling process to obtain up-sampled features. The up-sampled features can be combined with intermediate features having a same resolution and number of channels via a skip connection. These inputs are processed using a final neural network layer to produce output features. In some cases, the output features have the same resolution as the initial resolution and the same number of channels as the initial number of channels.

In some cases, a U-Net takes additional input features to produce conditionally generated output. For example, the additional input features could include a vector representation of an input prompt. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt describing content to be included in a generated image. For example, a user may provide the prompt, such as "a mouse performing a [V] motion". In some examples, guidance can be provided in a form other than text, such as via an image, a sketch, or a layout. The system converts the text prompt (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

A noise map is initialized that includes random noise. The noise map may be in a pixel space or a latent space. By initializing an image with random noise, different variations of an image including the content described by the conditional guidance can be generated. Then, the system generates an image based on the noise map and the conditional guidance vector.

A diffusion process can include both a forward diffusion process for adding noise to an image (or features in a latent space) and a reverse diffusion process for denoising the images (or features) to obtain a denoised image. The forward diffusion process can be represented as $q(x_t|x_{t-1})$, and the reverse diffusion process can be represented as $p(x_{t-1}|x_t)$. In some cases, the forward diffusion process is used during training to generate images with successively greater noise, and a neural network is trained to perform the reverse diffusion process (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$. The forward diffusion process is generally associated with the training of the latent diffusion model. An example method of training the latent diffusion model is described with reference to FIG. 9.

The neural network may be trained to perform the reverse process. The reverse diffusion process is the basis for image and video generation. During the reverse diffusion process, the model begins with noisy data $x_T$, such as a noisy image and denoises the data to obtain the $p(x_{t-1}|x_t)$. At each step $t-1$, the reverse diffusion process takes $x_t$, such as first intermediate image, and t as input. Here, t represents a step in the sequence of transitions associated with different noise levels, The reverse diffusion process outputs $x_{t-1}$, such as second intermediate image iteratively until $x_T$ is reverted back to $x_0$, the original image. The reverse process can be represented as:

$$p_\theta(x_{t-1}|x_t) := N(x_{t-1}; \mu_\theta(x_t, t), \Sigma_\theta(x_t, t)). \qquad (1)$$

The joint probability of a sequence of samples in the Markov chain can be written as a product of conditionals and the marginal probability:

$$x_T: \quad p_\theta(x_{0:T}) := p(x_T)\prod_{t=1}^{T} p_\theta(x_{t-1}|x_t), \qquad (2)$$

where $p(x_T)=N(x_T;0,I)$ is the pure noise distribution as the reverse process takes the outcome of the forward process, a sample of pure noise, as input and $\Pi_{t=1}^{T}=p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input and a generated data ã is mapped back into the pixel space from the latent space as output. In some examples, $x_0$ represents an original input image with low image quality, latent variables $x_1, \ldots, x_T$ represent noisy images, and x̃ represents the generated image with high image quality.

Generating Videos with a Custom Motion

A method for video generation is described. One or more aspects of the method include obtaining a text prompt indicating a custom motion; identifying a custom motion token corresponding to the custom motion; and generating, using a video generation model, a synthetic video based on the text prompt and the custom motion token, wherein the synthetic video depicts the custom motion.

Some examples of the method, apparatus, non-transitory computer readable medium, and system further include identifying a custom object token representing a custom object, wherein the synthetic video is generated based on the custom object token and depicts the custom object. In some aspects, the video generation model is trained to depict the custom motion based on the custom motion token. In some aspects, the text prompt includes a nonce character representing the custom motion.

Some examples of the method, apparatus, non-transitory computer readable medium, and system further include optimizing the custom motion token using the video generation model, or a dedicated embedding optimizer component. Some examples further include contextualizing the custom motion token based on the text prompt, wherein the synthetic video is based on the contextualized custom motion token.

FIG. 7 shows an example of a method 700 for providing a custom video to a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, a user provides a text prompt indicating a custom motion. The user may do so via a user interface as described with reference to FIGS. 1-2. In this example, the user inputs "a fluffy Persian cat performs the [V] dance", where "[V]" is a custom identifier in the form of a nonce character, and represents a custom dance where the actor swings their arms back and forth and steps side to side.

At operation 710, the system encodes text input to generate a text embedding, optionally optimizes the text embedding. The system may encode the text input using, for example, a text encoder as described with reference to FIG. 2, and then optimize the text embedding using an embedding optimizer. According to some aspects, optimizing the embedding can include a contextualization operation which updates embeddings of each word in the text input based on the embeddings of the other words.

At operation 715, the system generates a custom video including the custom motion. According to some aspects, this operation is performed by a video generation model trained to reproduce a custom motion associated with the custom identifier. Additional detail regarding the training is described with reference to FIG. 4.

Figure 8:
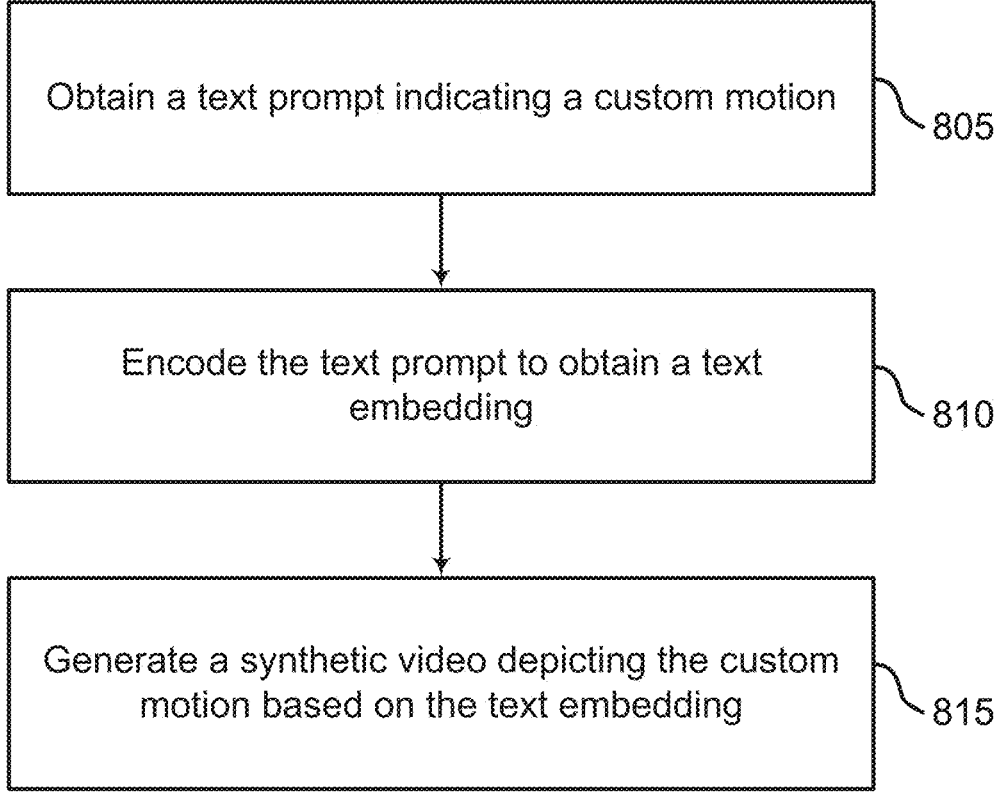
FIG. 8 shows an example of a method for generating a video with a custom motion according to aspects of the present disclosure.

FIG. 8 shows an example of a method 800 for generating a video with a custom motion according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains a text prompt indicating a custom motion. The text prompt may further include an object, e.g., an object designated to perform the custom motion. In some cases, the operations of this step refer to, or may be performed by, a user interface as described with reference to FIGS. 1 and 2. The custom motion may be indicated by a nonce token representing the custom motion, though embodiments are not limited thereto. For example, the custom motion may be indicated by natural language.

At operation 810, the system encodes the text prompt to obtain a text embedding. In some cases, the operations of this step refer to, or may be performed by, a text encoder as described with reference to FIGS. 2, 3, and 6. The term "custom motion token" may refer to the nonce character from the text prompt, or may refer to an embedding of the nonce character produced by the text encoder.

At operation 815, the system generates, using a video generation model, a synthetic video based on the text prompt and the custom motion token, where the synthetic video depicts the custom motion. For example, the synthetic video may include the object from the text prompt performing the custom motion. In some cases, the operations of this step refer to, or may be performed by, a video generation model as described with reference to FIGS. 2-4, and 11. According to some aspects, the video generation model is tuned to generate videos depicting an arbitrary entity performing the custom motion based on the custom motion token during a training phase. For example, the entity may be a human model, a humanoid character, an animal character, an anthropomorphized object, or some other actor. For example, the entity may be a non-human entity performing a human motion, such as a dance. In another example, the entity may be a non-human entity such as a car performing a custom driving motion. Training of the video generation model will be described with reference to FIGS. 9-11.

Training

A method for video generation is described. One or more aspects of the method include obtaining training data including a plurality of video clips depicting a custom motion and training, using the training data, a video generation model to generate synthetic videos based on a text prompt and a custom motion token representing the custom motion, wherein the synthetic video depicts the custom motion. Some examples further include training the video generation model to generate synthetic videos based on a custom object token that representing a custom object.

Some examples of the method, apparatus, non-transitory computer readable medium, and system further include augmenting the training data by generating one or more additional video clips based on the plurality of video clips. Some examples further include augmenting the training data by generating a plurality of captions for each of the plurality of video clips, respectively. Some examples further include tuning the video generation model using a reconstruction loss and a regularization loss, wherein the regularization loss reduces the association between the custom motion and one or more objects performing the custom motion the plurality of video clips. Some examples further include fixing one or more appearance layers and updating one or more temporal layers.

Some embodiments of the present disclosure customize video generation model with both appearance and motion. The appearance is represented through an exemplar dataset $D_s = \{x_{s_0}, \ldots, x_{s_N}\}$, where $x_{s_i}$ illustrates a subject or object to be added to the model. The motion is represented through videos $D_m = \{x_{m_0}, \ldots, x_{m_M}\}$. Training data may include both the appearance exemplars $D_s$ and the motion exemplars $D_m$, as well as corresponding textual descriptions $C_s$, $C_m$. The motion can be performed by different subjects across different backgrounds, and the commonality within the videos is purely the dynamic movement. The textual descriptions $C_s$, $C_m$ can be generic sentences, e.g., "a photo of a person [V]" (for the appearance set) or "a person doing the [X]" (for the motion). In some cases, a mapping is made between the identifiers, e.g., [V], to unused or lesser-used words so as to guide the text embedding to a cleaner area in the embedding space. An example of the unique text tokens is "pll" as "[V]" etc.

To customize a pre-trained text-to-video model $\theta$ with respect to a motion defined by the exemplar set $(D_M, C_M)$, the objective function $\mathcal{L}_\theta$ is minimized, as formulated below:

$$\min_\theta \sum_{(x_i, c_i) \in (D_M, C_M)} \mathcal{L}_\theta(x_i, c_i) \qquad (3)$$

In some embodiments of the present disclosure, the video generation model including parameters $\theta$ is trained using an objective function $\mathcal{L}_\theta(x,c)$ where $(x,c)$ is a video-text pair. The video is represented with a latent vector, stemming from Latent Diffusion Models (LDMs), which are diffusion models operating in the latent space instead of pixel space. Instead of learning the denoising process in a complex high-dimensional space, in some cases, the images are first encoded into a lower-dimensional vector through a learned encoder-decoder model. In some cases, the conditioning text $c_t$ is encoded through a text-embedding from a pretrained text encoder. The initial noise map is $\epsilon \sim \mathcal{N}(0,1)$. The diffusion timestep $t \sim \mathcal{U}(0,1)$, the noisy latent sample can be computed from the noise prediction by $x_t = \sqrt{a_t}x_0 + \sqrt{1-a_t}\epsilon$, where $x_0$ is the original image, $w_t$ is a user-defined variable that controls the sample quality and $a_t$ controls the amount of noise added at each diffusion timestep and its defined according to the noise scheduler. The model is trained (on top of the pretraining of the basis model) with following objective function:

$$\mathcal{L}_\theta(x, c) = \mathop{\mathbb{E}}_{(x,c,\epsilon,t)} \left[ w_t \left| |\theta(x_t, \epsilon, c, t) - \epsilon| \right|_2^2 \right] \qquad (4)$$

In some embodiments, the model's parameters are fine-tuned using Equation (3) with the pairs $(x,c) \in \{(D_s, C_s), (D_m, C_m)\}$. In some cases, the model is finetuned sequentially, first with respect to the motion and then the subject, or vice-versa, to customize the model with respect to both motion and appearance.

In some cases, training data are split into a training set and a regularization set. Regularization can aid in the training process by preventing the video generation model from forgetting concepts it had learned in a pre-training phase, and by the preventing video generation model from strongly associating motion concepts with appearance concepts. For example, regularization may prevent video generation model from associating a motion concept with a particular actor and a particular background.

In some embodiments, a regularization set is applied to avoid information loss during optimization (e.g., when optimizing the objective function using a specific person, the model can "forget" other people's appearance in the input) and to ensure that this knowledge is preserved. Some embodiments use real image and text pairs for the regularization set, instead of using generated videos, which can degrade the quality of the customized model. The objective function is formulated as follows:

$$\min_\theta \sum_{(x_i,c_i) \in (D_M, C_M)} \mathcal{L}_\theta(x_i, c_i) + \sum_{(x_j,c_j) \in (D_R, C_R)} \mathcal{L}_\theta(x_j, c_j) \qquad (5)$$

where the $(x_i, c_i)$ pairs are from either the appearance or motion exemplar sets $D_M$, $C_M$ and $(x_j, c_j)$ are from the regularization set $D_R$, $C_R$.

Figure 9:
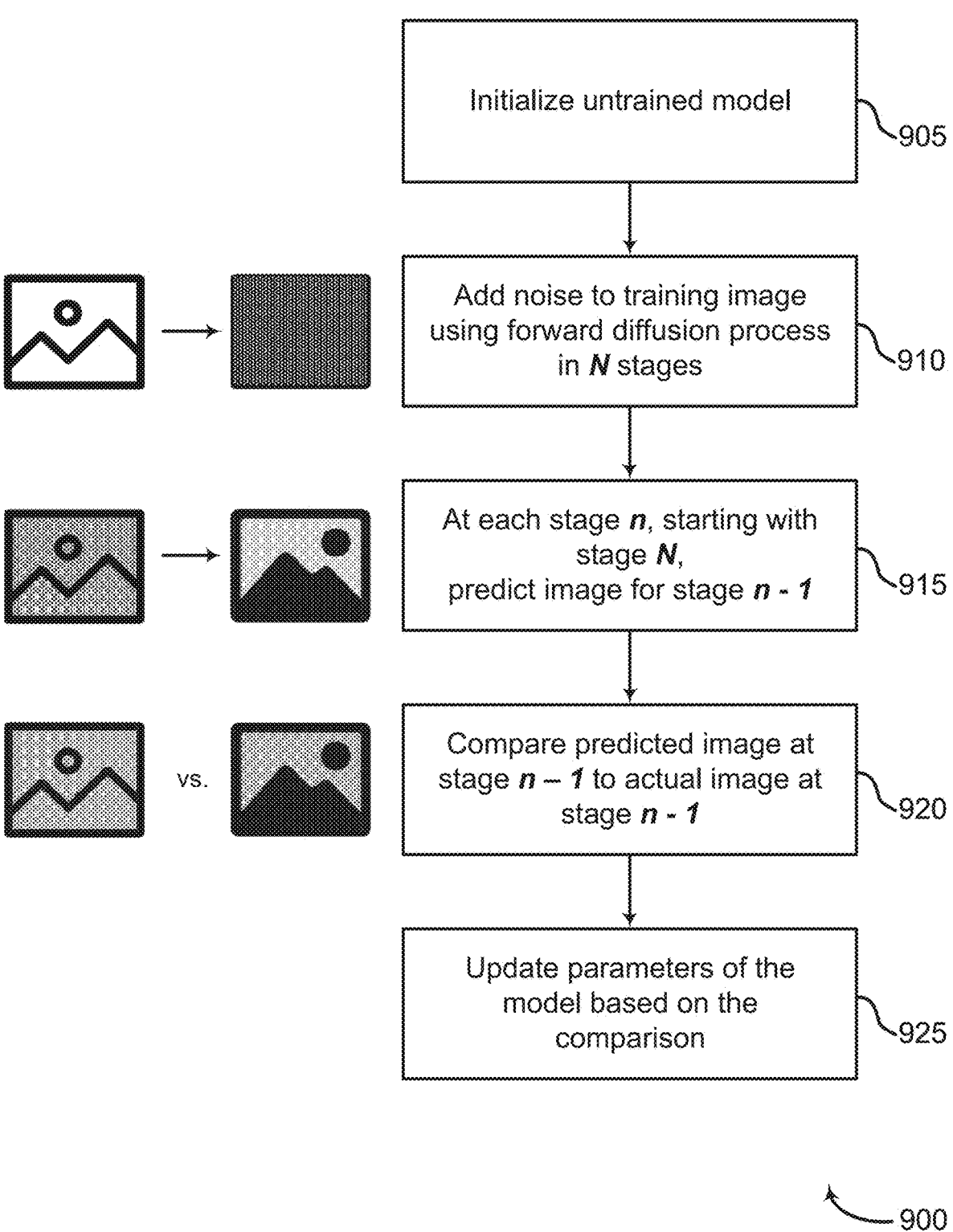
FIG. 9 shows an example of a method for training a diffusion-based video generation model according to aspects of the present disclosure.

FIG. 9 shows an example of a method 900 for training a diffusion-based video generation model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A diffusion model may be trained using both a forward and a reverse diffusion process. In one example, the user initializes an untrained model at operation 905. Initialization can include defining the architecture of the model and establishing initial values for the model parameters. In some cases, the initialization can include defining hyper-parameters such as the number of layers, the resolution and channels of each layer blocks, the location of skip connections, and the like.

The system then adds noise to a training image using a forward diffusion process in N stages in operation 910. In some cases, the forward diffusion process is a fixed process where Gaussian noise is successively added to an image. In latent diffusion models, the Gaussian noise may be successively added to features in a latent space.

In operation 915, each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

In operation 920, the training system compares predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data. The training system then updates parameters of the model based on the comparison at operation 925. For example, parameters of a U-Net may be updated using gradient descent. Time-dependent parameters of the Gaussian transitions can also be learned.

Figure 10:
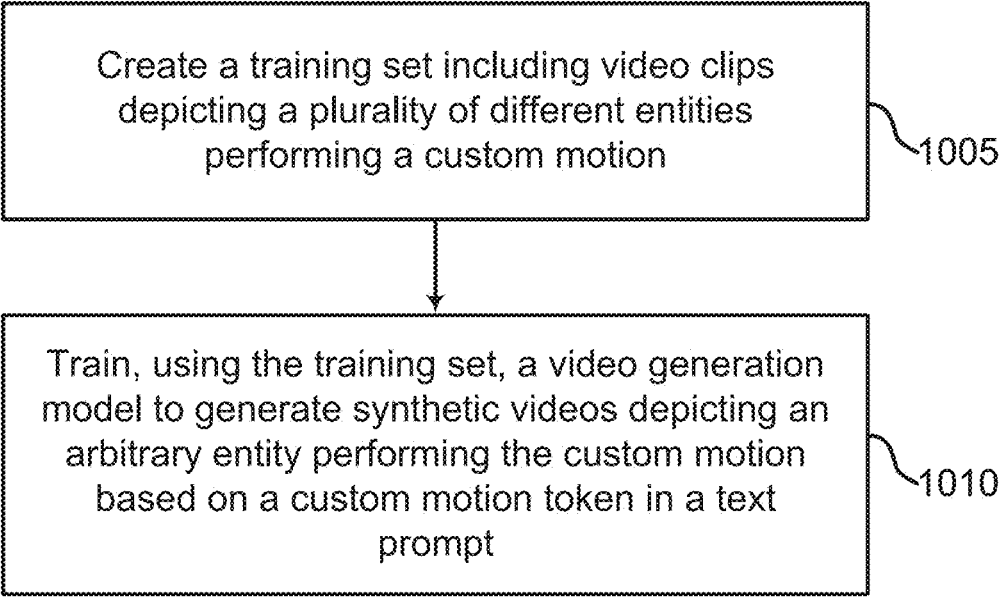
FIG. 10 shows an example of a method for training a machine learning model according to aspects of the present disclosure.

FIG. 10 shows an example of a method 1000 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system creates a training set including video clips depicting a plurality of different entities performing a custom motion. Examples of different entities include human models, cartoon characters, and other actors. In some embodiments, the entities consist of human models. In some cases, the operations of this step refer to, or may be performed by, a training component as described with reference to FIGS. 2 and 11. The training component may be implemented on the same video generation apparatus described with reference to FIG. 2, or may be implemented in a different system connected to the video generation apparatus. In some cases, creating a training set can include obtaining a preexisting set of training data for training the machine learning model.

At operation 1010, the system trains, using the training set, a video generation model to generate synthetic videos depicting an arbitrary entity performing the custom motion based on a custom motion token in a text prompt. In some cases, the operations of this step refer to, or may be performed by, the training component as described with reference to FIGS. 2 and 11. The system may update the video generation model by performing gradient descent based on the computed losses described with reference to Equations (3)-(5). According to some aspects, the training process enables the video generation model to generalize the motion to different types of actors that were not present in the training set. For example, even when the training set consists of clips of human actors, the video generation model can generalize the motion from the training set to generate a video of a non-human character performing the motion.

Figure 11:
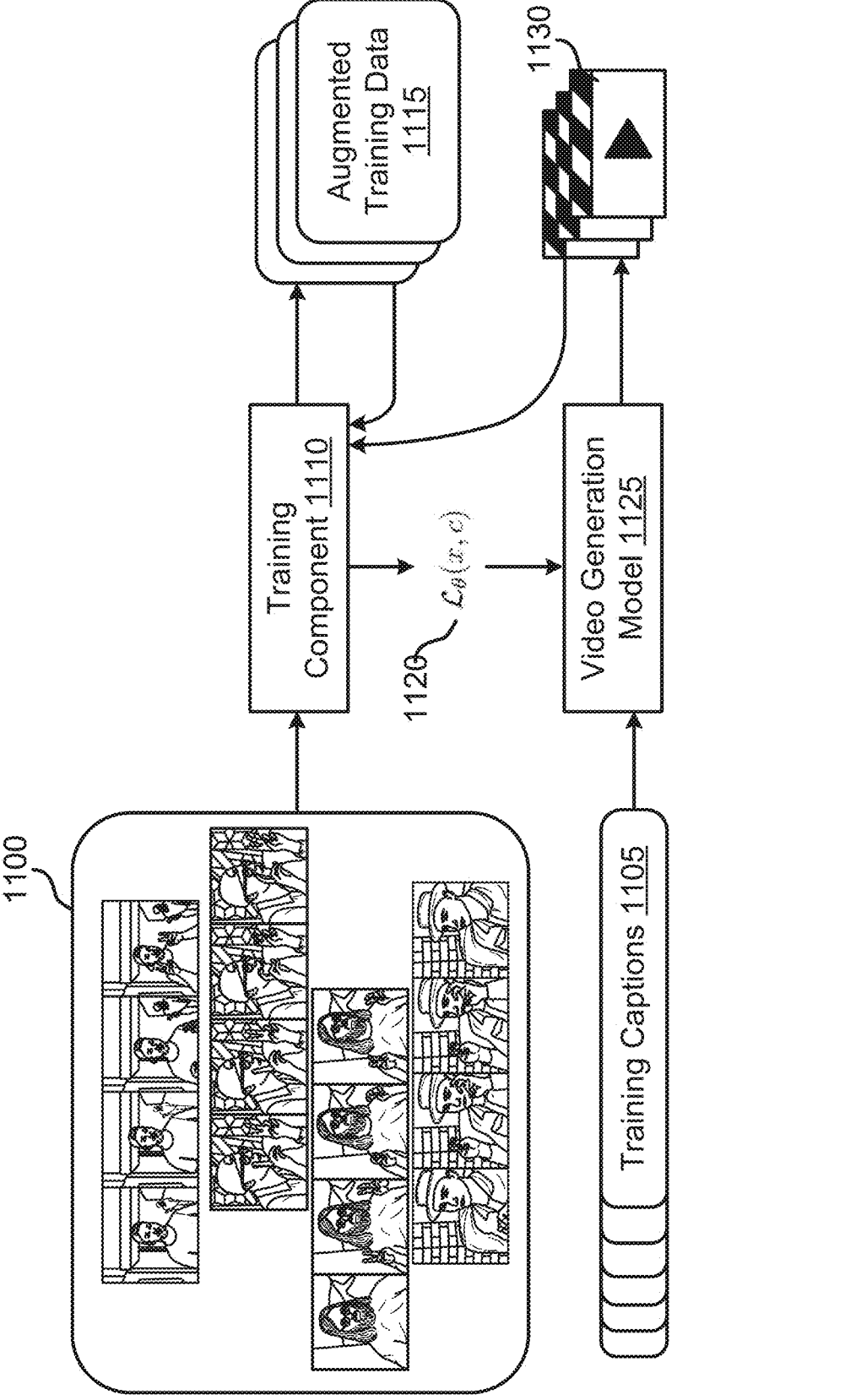
FIG. 11 shows an example of a video generation apparatus training pipeline according to aspects of the present disclosure.

FIG. 11 shows an example of a video generation apparatus training pipeline according to aspects of the present disclosure. The example shown includes training clips 1100, training captions 1105, training component 1110, augmented training data 1115, loss function 1120, video generation model 1125, and video outputs 1130.

Training clips 1100 is an example of, or includes aspects of, the corresponding element described with reference to FIG. 4. Training component 1110 is an example of, or includes aspects of, the corresponding element described with reference to FIG. 2. Video generation model 1125 is an example of, or includes aspects of, the corresponding element described with reference to FIGS. 2-4.

In this example, training data including training clips 1100 and training captions 1105 are input to training component 1110. Training component 1110 may use the training data directly, or may create augmented training data 1115 by applying various transformations to the training data. For example, augmented training data 1115 may include visual distortions or color changes to training clips 1100, as well as altered or additional training captions. In some embodiments, applying data augmentation improves the quality of the generated videos. The data augmentation can be applied both on the image/video data as well as the caption descriptions in the exemplar datasets $\{(D_s,C_s), (D_m,C_m)\}$. For example, spatial and color augmentations are applied to the image/video examples to improve the generalization to the subject. Some embodiments of the present disclosure use descriptive adjectives about the person performing the motion or the details about the video like scene, location, etc. to augment the text descriptions. The descriptive annotations are either formed manually or by using an image captioning system from a frame in the video, or by using a large language model to paraphrase the given captions. The image captioning system may include, for example, a Language Model (LM).

Training component compares the training data or the augmented training data to video outputs 1130 generated by video generation model 1125, and computes a loss function 1120 based on the comparison. The loss function quantifies the differences from the video outputs 1130 and the training data, and may be computed based on the Equations (3)-(5) above. Training component 1110 then updates parameters of video generation model 1125 based on the computed loss, e.g., through backpropagation. In some cases, some parameters of video generation model 1125 are updated while others are held fixed. When learning a motion concept, for example, a subset of the training clips 1100 and training captions 1105 may be used corresponding to the motion concept, and motion layers of video generation model 1125 may be updated while appearance layers (e.g., spatial layers) are held fixed.

FIG. 12 shows an example of a computing device 1200 according to aspects of the present disclosure. The example shown includes computing device 1200, processor(s), memory subsystem 1210, communication interface 1215, I/O interface 1220, user interface component(s), and channel 1230.

In some embodiments, computing device 1200 is an example of, or includes aspects of, video generation apparatus 100 of FIG. 1. In some embodiments, computing device 1200 includes one or more processors 1205 that can execute instructions stored in memory subsystem 1210 to obtain a text prompt indicating a custom motion; identify a custom motion token corresponding to the custom motion; and generate, using a video generation model, a synthetic video based on the text prompt and the custom motion token, wherein the synthetic video depicts the custom motion.

According to some aspects, computing device 1200 includes one or more processors 1205. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1215 operates at a boundary between communicating entities (such as computing device 1200, one or more user devices, a cloud, and one or more databases) and channel 1230 and can record and process communications. In some cases, communication interface 1215 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1220 is controlled by an I/O controller to manage input and output signals for computing device 1200. In some cases, I/O interface 1220 manages peripherals not integrated into computing device 1200. In some cases, I/O interface 1220 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1220 or via hardware components controlled by the I/O controller.

According to some aspects, user interface component(s) 1225 enables a user to interact with computing device 1200. In some cases, user interface component(s) 1225 include an audio device, such as an external speaker system, an external display device such as a display screen, an input device (e.g., a remote-control device interfaced with a user interface directly or through the I/O controller), or a combination thereof. In some cases, user interface component(s) 1225 includes a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining a text prompt including an object and a custom motion token, wherein the custom motion token represents a custom motion;
encoding the text prompt to obtain a text embedding, wherein the text embedding represents the custom motion in an embedding space; and
generating, using a video generation model, a synthetic video by denoising image features based on the text embedding, wherein the synthetic video depicts the object performing the custom motion across a plurality of frames, and wherein the plurality of frames includes a first frame depicting the object with a first pose of the custom motion and a second frame depicting the object with a second pose of the custom motion different from the first pose.

2. The method of claim 1, wherein:
the text prompt includes a custom object token representing a custom object; and
the synthetic video depicts the custom object performing the custom motion.

3. The method of claim 1, wherein:
the text prompt includes a nonce character representing the custom motion.

4. The method of claim 1, further comprising:
optimizing the custom motion token using the video generation model.

5. The method of claim 1, further comprising:
modifying the custom motion token based on the text prompt to obtain a contextualized custom motion token, wherein the synthetic video is based on the contextualized custom motion token.

6. The method of claim 1, wherein:
the video generation model is trained using a training set including a plurality of videos depicting a plurality of entities performing the custom motion, respectively.

7. The method of claim 6, wherein:
the training set includes a plurality of videos depicting plurality of entities having a custom appearance, respectively, and wherein the custom appearance corresponds to a custom object token.

8. A method of training a machine learning model, the method comprising:
obtaining a training set including a plurality of video clips depicting a plurality of different entities performing a custom motion, respectively; and
training, using the training set, a video generation model to generate synthetic videos by denoising image features based on a text embedding that represents the custom motion in an embedding space, wherein the synthetic videos depict an arbitrary entity performing the custom motion based on a custom motion token in a text prompt, wherein the custom motion is performed across a plurality of frames, and wherein the plurality of frames includes a first frame depicting the object with a first pose of the custom motion and a second frame depicting the object with a second pose of the custom motion different from the first pose.

9. The method of claim 8, wherein training the video generation model comprises:
training the video generation model to generate synthetic videos depicting an entity having a custom appearance based on a custom object token in the text prompt.

10. The method of claim 8, wherein obtaining the training set comprises:

augmenting the training set by generating one or more additional video clips based on the plurality of video clips.

11. The method of claim 8, wherein obtaining the training set comprises:

augmenting the training set by generating one or more captions for each of the plurality of video clips, respectively, wherein each of the one or more captions includes the custom motion token.

12. The method of claim 8, wherein training the video generation model comprises:

tuning the video generation model using a reconstruction loss and a regularization loss, wherein the regularization loss reduces an association between the custom motion and one or more objects performing the custom motion the plurality of video clips.

13. The method of claim 8, wherein training the video generation model comprises:

fixing one or more appearance layers and updating one or more temporal layers of the video generation model.

14. An apparatus comprising:

at least one processor;

at least one memory storing instructions executable by the at least one processor; and a video generation model comprising parameters stored in the at least one memory and trained to generate a synthetic video by denoising image features based on a text embedding that represents a custom motion in an embedding space, wherein the synthetic video depicts an arbitrary entity performing the custom motion, where the custom motion is identified by a custom motion token within a text prompt, wherein the custom motion is performed across a plurality of frames, and wherein the plurality of frames includes a first frame depicting the object with a first pose of the custom motion and a second frame depicting the object with a second pose of the custom motion different from the first pose.

15. The apparatus of claim 14, further comprising:

a user interface configured to obtain the text prompt.

16. The apparatus of claim 14, wherein:

the video generation model comprises a diffusion model.

17. The apparatus of claim 14, wherein:

the video generation model comprises a transformer model.

18. The apparatus of claim 14, further comprising:

a text encoder configured to encode the text prompt to obtain a text embedding.

19. The apparatus of claim 14, further comprising:

an embedding optimizer configured to contextualize the custom motion token.

20. The apparatus of claim 14, further comprising:

a training component configured to train the video generation model based on training data.

* * * * *